United States Patent [19]

Goel

[11] Patent Number: 4,740,539
[45] Date of Patent: Apr. 26, 1988

[54] FLEXIBLE TWO-COMPONENT EPOXY STRUCTURAL ADHESIVES

[75] Inventor: Anil B. Goel, Worthington, Ohio

[73] Assignee: Ashland Oil, Inc., Ashland, Ky.

[21] Appl. No.: 854,227

[22] Filed: Apr. 21, 1986

[51] Int. Cl.⁴ ............................................. C08L 75/00
[52] U.S. Cl. ................................... 523/400; 523/451; 524/709; 524/906; 525/111; 525/452; 528/51; 528/60; 528/61; 528/73
[58] Field of Search ............... 524/709, 906; 525/111, 525/452; 528/73, 51, 60, 61; 523/400, 451

[56] References Cited

U.S. PATENT DOCUMENTS 4,661,539  4/1987  Goel ..................................... 523/400

Primary Examiner—Maurice J. Welsh
Attorney, Agent, or Firm—John F. Jones

[57] ABSTRACT

A two component structural adhesive which is composed of a mixture of an epoxy component which comprises a polyepoxide and a polyisocyanate and a hardener component which comprises a long chain, flexible polyamine and an epoxy resin homopolymerization catalyst is described.

10 Claims, No Drawings

FLEXIBLE TWO-COMPONENT EPOXY STRUCTURAL ADHESIVES

This invention relates to novel, flexible, two-component epoxy structural adhesives and to the process for their preparation and more particularly pertains to two-component structural adhesives which involves the use of interpenetrating polymer networks based on simultaneous or sequential homopolymerization of epoxides and copolymerization of polyisocyanates with long chain flexible polyamines.

These highly flexible adhesives exhibit excellent adhesive performance, particularly in the adhesion to fiber glass reinforced sheet molding compounds (SMC).

The present invention is an improvement over the invention more fully disclosed in my copending U.S. Pat. application Ser. No. 842,586, filed Mar. 21, 1986 now U.S. Pat. No. 4,661,539.

A variety of active hydrogen compounds (polyamines polyacids, polymercaptans, polyphenols, etc.) have been used as curing agents for epoxide resins to give thermosetting polymers which have been used in adhesive applications. Although the two-component adhesive compositions based on the above chemistry exhibit excellent adhesion properties towards stiff structural materials, most of the prior art systems result in polymers which are rigid and brittle with high modulus.

The existing two-component adhesive polymers based on epoxy resins and amine hardeners are often too stiff and brittle, thus causing problems such as read-through (deformation) of fiber glass reinforced sheet molding compounds when the adhesives are used to adhere them together in applications such as automobile components. Prior art inclusion of flexibilizers such as urethane elastomers and butadiene rubber generally result in significant increase of viscosities of the individual components without the addition of fillers and other reinforcing materials. Interpenetrating polymer networks based on simultaneous or sequential polymerization of epoxy (homopolymer) and copolymerization of isocyanate with long-chain, flexible polyamines has not previously been disclosed in the prior art.

A significant improvement in flexibility of the final adhesive-SMC structure as well as a two-component adhesive composition which shows excellent adhesive properties without causing any viscosity increase of the individual components is provided by the present invention.

The epoxy component of the two component epoxy adhesives of this invention is composed of an epoxy resin such as a liquid diglycidyl ether of Bisphenol-A having an epoxy equivalent weight of about 180–200, for instance, although other known epoxy resins may also be used. In order to improve the flexibility and the toughness of the final adhesive, a small amount of flexibilizer can be included in the epoxy resin component. Flexibilizers can include rubbers and urethane elastomers.

The epoxy resins or polyepoxides useful in this invention can be monomeric or polymeric, saturated or unsaturated, aliphatic, cycloaliphatic, aromatic or heterocyclic and they may be substituted, if desired, with other substituents besides epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 2, that is to say, compounds containing more than one group per molecule of the formula

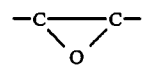

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl 9,10,12,13-diepoxy stearate, or the dimethyl ester of 6,7,10,11-diepoxyhexadecane-1,16-dicarboxylic acid. Furthermore, there may be mentioned epoxidized mono-, di- or polyesters, and mono-, di-, or polyacetals containing at least one cycloaliphatic 5-membered or 6-membered ring, to which at least two 1,2-epoxidized groups are linked.

A widely used class of polyepoxides which can be used in this invention are the epoxy polyethers obtained by reacting a halogen containing epoxide of dihalohydrin, such as epichlorohydrin, epibromohydrin, 3-chloro-1,2-epoxyoctane, and the like with either a polyhydric phenol or a polyhydric alcohol.

Polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. No. 3,350,362 and 3,382,215. Polyisocyanates which are polymeric in nature including isocyanate prepolymers of all types are included in this invention.

Desired features of two-component structural adhesives for many types of applications which are provided by this invention include individual components having low viscosities (generally less than 200,000 cps) enabling them to be used by gravity feed method, non-critical mix ratios giving foolproof mixing (as much as 50% variation possible), non-sagging character of the mixed adhesive before gelation, reasonably long room temperature open time (usually about 30 minutes), rapid curing (or gelling) upon heat (preferably about 100 degrees C. in about 5 min.), no need for rigorous surface preparation (cleaning, scratching, scrubbing, priming, etc.), high flexibility and tough adhesive bond with high shear and peel strengths at temperatures in the range of from room temperatures to about 200 degrees F., low hygroscopicity of the adhesive, and high heat resistance of the adhesive bond (at 400 degrees F. for about one hour).

I have discovered that the polymeric compositions obtained by the interpenetrating polymer network of homopolymerized epoxide resins simultaneously or sequentially with copolymerization of polyisocyanate with long chain flexible polyamines, are highly flexible and show good adhesive performance. Because the polymerization rate of polyisocyanates with polyamines is very rapid, it provides the mechanism for the buildup of the non-sagging property in the adhesive. The resulting polymers are flexible due to the long chain backbone. In addition to this, small amounts of additional flexibilizing agents such as butadiene rubber, urethane elastomer and the like may also be included in the adhesive components. Furthermore, use of chain extender and chain termination reagents such as phenolics (phenol, Bisphenol-A and the like) may also be included to further flexibilize the system as well as to improve the epoxy polymerization rate. To improve further the non-sagging behavior of the mixture, a small amount of thixotropic agents such as fumed silica in the epoxy component which contains the regular fillers such as talc, alumina, kaolin, etc. may also be included. Thus, the two component flexible epoxy adhesive consists of (1) an epoxy component containing polyisocyanate, and (2) a hardener component containing an epoxy homopolymerizing catalyst dissolved in a long-chain polyamine. The epoxy component contains mainly the liquid diglycidyl ether of Bisphenol-A, a small amount of polyisocyanate (1 to 10%) and optionally 10 to 20% by weight of commercially available carboxylic acid-terminated butadiene/acrylonitrile rubber which is reacted with the epoxy resin or the urethane elastomer. This component is filled with fillers such as talc, alumina, metal oxides such as $Fe_2O_3$, metals and optionally a small amount of fumed silica (0 to 8%). The hardener component consists of an epoxy homopolymerizing catalyst dissolved in a long chain flexible polyamine which is a compound having alkylene ether repeat units in the chain and 2 to 6 primary and/or secondary amine groups (molecular weight 400 to 10,000). This component may also contain some phenol. The preferred epoxy homopolymerization catalysts are those containing tertiary amines such as tris(dimethylaminomethyl) phenol, N,N', N"-tris (dimethylaminopropyl) hexahydrotriazine, substituted piperazines and their derivatives and cationic catalysts such as Lewis acids complexed with bases; e.g. $BF_3$. amine, alkali and alkaline earth metal cationic salts, e.g. $M(X)_n$ (where M is lithium, magnesium, calcium, and the like and X is $BF_4$, $PF_6$, $ClO_4$, $AsF_6$, $SbF_6$, iodonium and sulfonium salts and the like. The amount of these catalysts may be in the range of from about 1 to about 15% by weight of the total hardener component. The amount of the long-chain flexible amine may be in the range of from 85 to 99% and the amount of phenolic chain extender and chain terminator may be in the range of from 0 to 30% by weight based on the combined weights of amine and catalyst. The hardener component may be filled with fillers such as talc, alumina, kaolin, silica, metal powders, metal oxides, and the like in amounts from 0 to 40% by weight based on the weight of the other ingredients.

Although mixing the epoxy and the hardener components in appropriate ratio is suspected to result in two types of polymerization reactions; i.e. (1) the rapid polyisocyanate copolymerization with long-chain amine and maybe with phenolics, and (2) the homopolymerization of epoxy resin catalyzed by tertiary amine or cationic catalyst along with chain-extending and chainC-termination reaction with phenolic reagents; however, it is quite likely that a part of the primary and secondary amine functionality may also interact with epoxy groups thus causing chain extension, chain termination and crosslinking. During the polymerization a phase separation of polymers is generally observed which results in improving the flexibility and the toughening properties of the adhesive composition. No such phase separation could be observed in the systems which do not involve the above-described probably interpenetrating polymer network polymerization, or when short-chain polyamines capable of reacting significantly with epoxide groups are used in the hardener components. Phase separation also helps to reduce the known shrinkage occurring during the epoxy polymerization.

The flexible two-component epoxy adhesive of this invention exhibits excellent adhesive performance and tolerates thermal and mechanical stresses and shocks as well as possessing high lap shear strengths and excellent peel strengths.

This invention is further illustrated in the following representative examples.

EXAMPLE 1

The following general procedure was used for preparing adhesive bonds in the examples which follow. The two components, i.e., the epoxy resin component and the hardener component, were mixed in appropriate weight amounts under an inert atmosphere (such as nitrogen) at about room temperature. The resulting mixture was applied in the form of a ⅜ inch bead across the first substrate (sheet molding compound laminate) that measured 12 inches by 4 inches by 100 mils (thickness) and the substrate had been dry wiped before application of the adhesive. After sprinkling a few 30 mils diameter glass beads on the top of the adhesive to get a final glue line thickness of 30 mils, a second laminate was placed on the top of the first with a one-inch overlap between laminates. The samples were then cured in a heated fixture at 230 degrees F. under one psi pressure for four minutes followed by postcuring in an oven at 285 degrees F. for 30 minutes. Test specimens were cut from these resulting structures in one-inch wide strips. In this way several test samples were prepared for each adhesive tested. The adhesives were also tested on primed (urethane polymer) cold rolled steel one-inch wide strips.

The following tests were carried out on the test specimens using a set of at least three test specimens for each type of test.

A. Shear strength test at room temperature after ½ hour postcuring at 285 degrees F.

B. Postbaking at 400 degrees F. for an additional one hour and test shear strength at room temperature.

C. Shear strength test at 180 degrees F. after 30 minutes curing at 285 degrees F.

D. Shear strength test at room temperature on 285 degrees F. postcure samples after immersion for 24 hours in 206 degrees F. water.

EXAMPLE 2

A liquid diglycidyl ether of Bisphenol-A (epoxy equivalent weight of about 180–190) (375.3 g), a carboxylic acid terminated butadiene/acrylonitrile copolymer (18% acrylonitrile) (1300×8 CTBN Hycar rubber from B. F. Groodrich) (29 g) and triphenyl phosphine (0.7 g) were mixed and heated at 115 degrees C. for one hour to give a clear solution. The reaction temperature was brought down to 70 degrees C. and 115 g of dry talc filler were added and mixed thoroughly with a high shear mixer. To this mixture was added 22 g of fumed silica with vigorous mixing. Twelve grams of tetramethyl xylene diisocyanate were added to the mixture and the mixture was degassed under reduced pressure to give a creamy gravity flow liquid epoxy component having a 70 degrees F. viscosity of 110,000 cps.

EXAMPLE 3

An epoxy component was prepared by following the procedure of Example 2 using 350 g of the epoxy resin, 25 g of the carboxylic acid terminated butadiene/acrylonitrile rubber, 0.6 g of triphenyl phosphine, 100 g of talc, 20 g of fumed silica and 10 g of isophoronediisocyanate.

EXAMPLE 4

A hardener component was prepared by mixing 250 g of poly(propylene oxide) triamine (5000 molecular weight primary amine terminated triamine, obtained from Texaco Chem. Co.), 50 g of Bisphenol-A and 75 g of tris(dimethylaminomethyl)phenol at 70 degrees C. and filled with 180 g of dry Kaophile-2 (aluminum hydroxide treated kaolin). The room temperature viscosity of the resulting hardener component was found to be 61,000 cps.

EXAMPLE 5

The procedure of Example 4 was followed using 200 g of the triamine, 25 g of Bisphenol-A and 75 g of tris(dimethylaminomethyl)phenol and 149 g of Kaophile-2 filler. The viscosity of the resulting hardener component was found to be 65,000 cps.

EXAMPLE 6

The procedure of Example 4 was followed using 200 g of the triamine, 40 g of the tris(dimethylaminomethyl) phenol and 150 g of Kaophile-2 filler. The viscosity of the resulting hardener component was found to be 64,000 cps.

EXAMPLE 7

The procedure of Example 4 was followed using 240 g of the poly(propylene oxide)triamine (3000 molecular weight primary amino group terminated triamine), 94 g of Bisphenol-A, 67 g of poly(propylene oxide) diamine (molecular weight of 400), 25 g of tris(dimethylaminomethyl)phenol and 200 g of talc filler to give a gravity flow mixture with a viscosity of 95,000 cps.

EXAMPLE 8

This example, which is outside the scope of this invention, demonstrates that the epoxy component of Example 2 can be homopolymerized rapidly by using the tris(dimethylaminomethyl)phenol as the tertiary amine catalyst. In an aluminum cup was mixed 15 g of the epoxy resin of Example 2 and 2 g of tris(dimethylaminomethyl)phenol. The resulting mixture was heated at 230 degrees F. and gelation occurred within two minutes to give a solid, hard, but brittle polymer. Approximately 2% shrinkage was noticed during polymerization.

EXAMPLE 9

This example demonstrates that the high molecular weight amines cure epoxy resins only at a very slow rate. The procedure of Example 8 was followed using 5 g of the epoxy resin component of Example 2 and 15 g of 5000 molecular weight poly(propylene oxide) triamine. The reaction mixture remained liquid even after heating at 230 degrees F. for 15 minutes. Thus in adhesive compositions described in later examples, the amine reacts with epoxy only slowly, however, the amine reacts rapidly with isocyanates thus providing two types of polymerization reactions.

EXAMPLE 10

This experiment demonstrates that the epoxy resins containing polyisocyanate can be polymerized rapidly with a mixture of high molecular weight amine containing small amounts of tris(dimethylaminomethyl)phenol. The epoxy resin component of Example 3 (10 g) was mixed with 10 g of the amine hardener component of Example 6. The resulting mixture gelled in approximately 4 minutes at 230 degrees F. to give a solid flexible polymer.

EXAMPLE 11

The epoxy resin component of Example 2 and the hardener component of Example 4 were mixed in 1:1 and 1.5:1 weight ratios respectively, to obtain adhesive mixtures which were tested on fiberglass reinforced sheet molding compound (SMC) panels. Upon mixing of the components a rapid non-sag character was built up in the adhesive mixture. The adhesive bonds were prepared and the testing was done in accordance with the procedure of Example 1. Additional wedge testing samples were made using 3 inch by 4 inch SMC coupons. The ratios use and results obtained are give in Table 1. Most samples tested for shear strength showed delamination (DL) of the SMC substrate.

TABLE 1

| Sample No. | Test Procedure | Lap Shear Strength (psi) 1:1 Ratio | 1.5:1 Ratio |
|---|---|---|---|
| 1 | A | 558 DL | 500 DL |
| 2 | A | 570 DL | 453 DL |
| 3 | A | 555 DL | 495 SB** |
| 4 | B | 700 DL | 620 DL |
| 5 | B | 575 DL | 646 DI, |
| 6 | B | 630 DL | 610 DL |
| 7 | C | 521 DL | 671 DL |
| 8 | C | 484 DL | 600 DL |
| 9 | C | 535 DL/AF* | 545 DL |

*AF means adhesive failure
**SB means SMC specimen broke

EXAMPLE 12

Adhesive bonds were prepeared using the epoxy resin component of Example 3 and the hardener component of Example 5 in 1:1 and 1.5:1 weight ratios, respectively. The results are give in Table 2.

TABLE 2

| Sample No. | Test Procedure | Lap Shear Strength (psi) 1:1 Ratio | 1.5:1 Ratio |
| --- | --- | --- | --- |
| 1 | A | 558 DL | 500 DL |
| 2 | A | 570 DL | 453 DL |
| 3 | A | 555 DL | 495 SB** |
| 4 | B | 700 DL | 620 DL |
| 5 | B | 575 DL | 646 DI |
| 6 | B | 630 DL | 610 DL |
| 7 | C | 521 DL | 671 DL |
| 8 | C | 484 DL | 600 DL |
| 9 | C | 535 DL/AF* | 545 DL |

*AF means adhesive failure
**SB means SMC specimen broke

EXAMPLE 13

Adhesive lap shear bonds and wedge testing bonds were prepared using the epoxy resin component of Example 2 and the hardener component of Example 7 in 1:1 and 1.5:1 weight ratios, respectively. All of the lap shear bonds on SMC panels tested in procedures A through C of Example 1 resulted in delamination in the range of 430 to 710 psi. The wedge testing samples gave 100% fiber tear. When this adhesive was tested on aluminum sheets (untreated) lap shear strengths of about 2050 psi were obtained.

EXAMPLE 14

The adhesive composition obtained from 2:1 weight ratio mixing of an epoxy resin containing 63% by weight of liquid diglycidyl ether of Bisphenol-A, 12% by weight of liquid methylene bis(phenyl isocyanate) (NCO equivalent weight of 144) and 25% by weight of talc filler with a hardener containing 30% by weight of poly(propylene oxide) diol capped with ethylene oxide (molecular weight of 200), 25% by weight of poly(propylene oxide) triamine (5000 molecular weight), 6% by weight of BF$_3$.amine catalyst and 30% by weight of talc filler, upon mixing, showed non-sag property. Upon testing, the lap shear bonds showed SMC delamination in the range of 400 to 650 psi.

I claim:

1. A two component structural adhesive composed of a mixture comprising
   (1) an epoxy component comprising a polyepoxide and a polyisocyanate, and
   (2) a hardener component comprising an epoxy resin homopolymerization catalyst and a long-chain flexible polyamine.

2. The adhesive of claim 1 wherein the polyepoxide is a compound having an epoxy equivalent weight of about 18–200 which contains more than one group per molecule of the formula

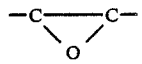

3. The adhesive of claim 2 wherein the polyisocyanate is one having at least two isocyanate groups per molecule.

4. The adhesive of claim 3 wherein the long chain flexible polyamine is a compound having alkylene ether repeat units in the chain and 2 to 6 primary and/or secondary amine groups with a molecular weight in the range of from 400 to 10,000.

5. The adhesive of claim 4 wherein each component has a viscosity less than 200,000 cps.

6. The adhesive of claim 5 wherein the component (1) contains from 1 to 10% by weight of polyisocyanate and optionally 10 to 20% by weight of a carboxylic acid terminated butadiene/acrylonitrile rubber.

7. The adhesive of claim 6 wherein the long chain flexible polyamine is present in (2) in from 85 to 99% by weight and the epoxy homopolymerization catalyst is present in (2) in from 1 to 15% by weight.

8. The adhesive of claim 1 wherein the epoxy component contains a liquid diglycidyl ether of Bisphenol-A, a carboxylic acid terminated Butadiene/acrylonitrile copolymer and triphenyl phosphine.

9. The adhesive of claim 1 wherein the hardener component contains poly(propylene oxide) triamine, Bisphenol-A and tris(dimethylaminomethyl) phenol.

10. The adhesive of claim 1 wherein the hardener component contains poly(propylene oxide)triamine, Bisphenol-A, poly(propylene oxide)diamine and tris(dimethylaminomethyl)phenol.

* * * * *